US006809803B1

United States Patent
O'Brien et al.

(10) Patent No.: US 6,809,803 B1
(45) Date of Patent: Oct. 26, 2004

(54) SURFACE TOPOLOGY INSPECTION

(75) Inventors: Edwin W O'Brien, Bristol (GB); Andrew R Ibbotson, Bristol (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 09/466,899

(22) Filed: Dec. 20, 1999

(30) Foreign Application Priority Data

Dec. 24, 1998 (GB) .............................................. 9828474

(51) Int. Cl.[7] .......................... G01L 1/24; G01B 11/16; G01B 11/24; G01B 11/14; H01J 3/14
(52) U.S. Cl. ........................ 356/35.5; 356/32; 356/34; 356/35; 356/601; 356/603; 356/605; 356/618; 250/237 G
(58) Field of Search ........................... 356/35.5, 32, 34, 356/35, 601, 603, 605, 618, 512, 499, 521; 250/237 G

(56) References Cited

U.S. PATENT DOCUMENTS

| 4,459,027 A | | 7/1984 | Kafri et al. | |
|---|---|---|---|---|
| 4,489,729 A | * | 12/1984 | Sorenson et al. | ............ 600/447 |
| 4,564,295 A | * | 1/1986 | Halioua | ....................... 356/605 |
| 4,697,927 A | * | 10/1987 | Ono | ............................ 356/513 |
| 5,000,574 A | | 3/1991 | Scotese et al. | |
| 5,075,562 A | * | 12/1991 | Greivenkamp, Jr. et al. | ..... 250/561 |
| 5,311,286 A | | 5/1994 | Pike | |
| 5,436,462 A | | 7/1995 | Hull-Allen | |
| 5,619,327 A | | 4/1997 | O'Brien | |
| 5,636,025 A | * | 6/1997 | Bieman et al. | ............. 356/619 |
| 5,779,965 A | * | 7/1998 | Beuther et al. | ............. 264/280 |
| 5,836,872 A | * | 11/1998 | Kenet et al. | ................ 600/306 |
| 5,898,486 A | * | 4/1999 | Chesko et al. | ............. 356/35.5 |
| 5,967,979 A | * | 10/1999 | Taylor et al. | ................ 600/407 |
| 6,731,391 B1 | * | 5/2004 | Kao et al. | .................... 356/605 |
| 2003/0071194 A1 | * | 4/2003 | Mueller et al. | .......... 250/208.1 |

FOREIGN PATENT DOCUMENTS

GB          2 326 228          12/1998

* cited by examiner

*Primary Examiner*—Gregory J. Toatley, Jr.
*Assistant Examiner*—Khaled Brown
(74) *Attorney, Agent, or Firm*—Nixon & Vanderhye P.C.

(57) ABSTRACT

Apparatus and a method for inspecting a topology of a surface (2) of a structural member (1) are provided. The degree to which a known type of stress has been applied to the member may be ascertained using a Moiré grid (8). The method involves providing a range of calibration samples of structurally equivalent members, the samples each having been subject to the known type of stress to a differing respective degree. Measurements taken using the apparatus and method of the invention are then compared with measurements taken from a calibration sample to determine the amount of stress which has been applied.

19 Claims, 7 Drawing Sheets

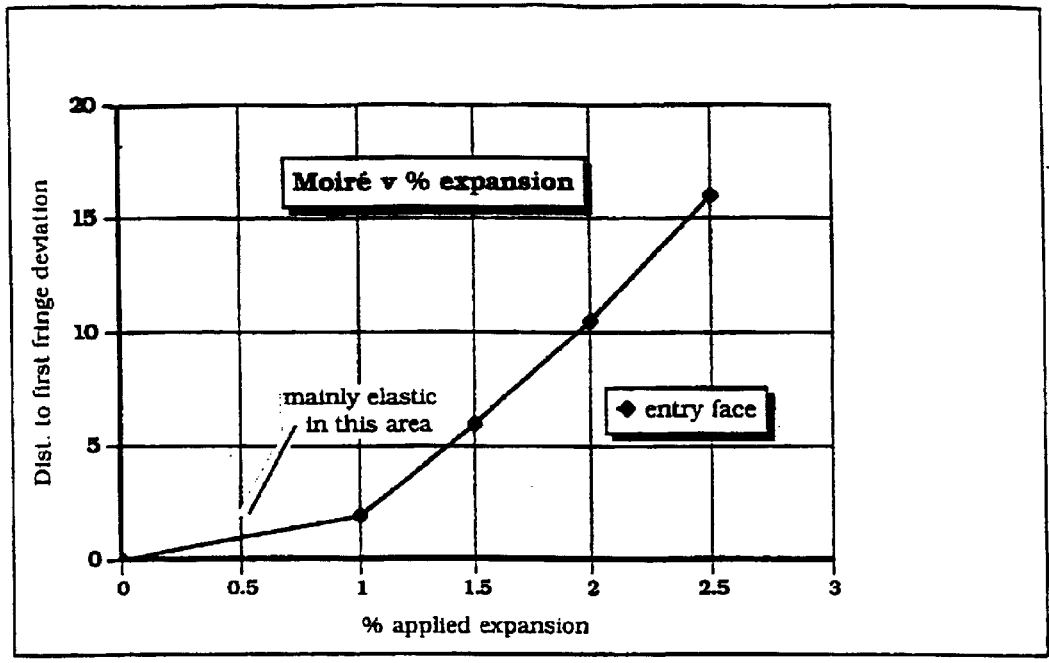
Fig. 5 a. Graph of extent of Poissons effect versus degree of applied expansion - entry face.
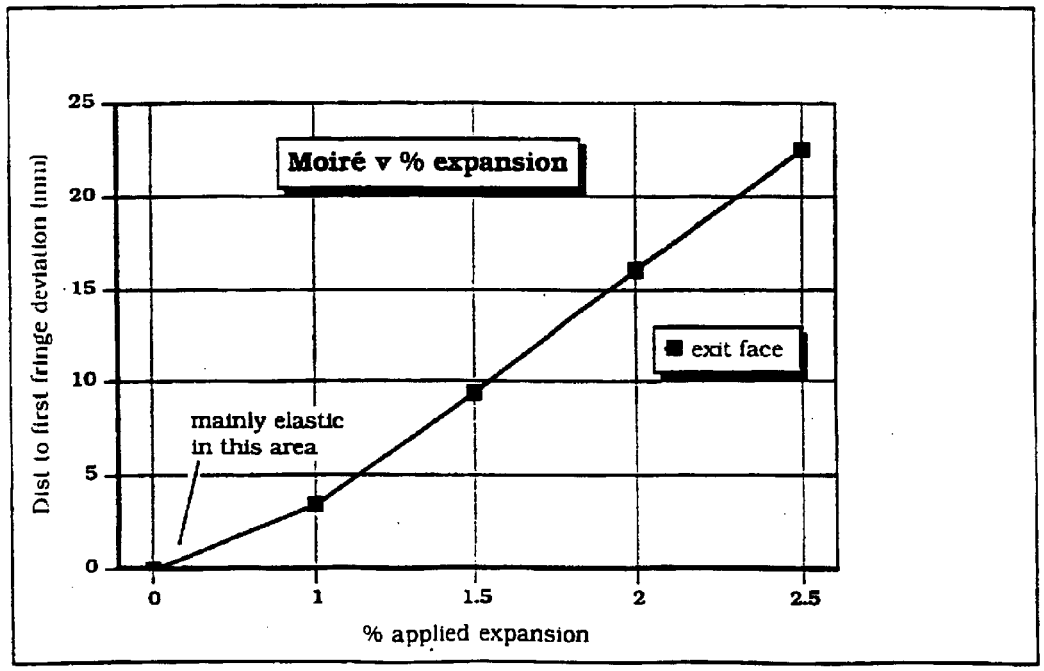
Fig. 5 b. Graph of extent of Poissons effect versus degree of applied expansion - exit face.

SURFACE TOPOLOGY INSPECTION

BACKGROUND TO THE INVENTION

This invention relates to the inspection of surface topology, and in particular to inspection of the surfaces of structural members subject to high stresses.

In structural members subject to high stresses, for example metallic or fibre reinforced plastics composite wings, the topology of the surface of the member can be of vital importance. In metallic bolted structures, for example, cold expansion of fastener holes can increase the fatigue life of the member many times by prevention of the formation of cracks emanating from hole walls. A standard method of cold expanding such holes involves drawing a mandrel through a split sleeve within the hole and expanding the sleeve to form a zone of compression in the material surrounding the hole. The effect of creating this zone of compression around the hole is to cause a volcano-like disturbance or eruption of the surface surrounding the hole, due to the Poisson effect. This surface disturbance or eruption can extend up to a radius from the hole edge. Contrary to general belief it has now been found that the extent of the Poisson volcano around the cold-expanded hole is directly related to the material properties of the member and to the degree of expansion applied to the hole, at least when such expansion is carried out in a controlled manner for example by the above mentioned method of drawing a mandrel through a split sleeve. The degree of expansion, eg. 1%, 2%, 3%, 4% etc. determines the level of fatigue enhancement applied to the hole. A very fine balance exists however between causing damage to the member, eg. plate material, by over-expanding on the one hand, and providing insufficient fatigue protection by under expanding on the other. For this reason it is important to be able to ascertain not only the presence or absence of cold expansion of holes but also the degree of such cold expansion in order to guarantee the integrity of structural members such as those in modern aircraft structures.

DESCRIPTION OF THE PRIOR ART

In our U.S. Pat. No. 5,619,327 we disclose a method of detecting cold expansion of holes in such a structural member as an aircraft wing. Unfortunately this method whilst fulfilling a vital and pressing need in enabling the first of the two above requirements to be determined, does not disclose a method of achieving the second in a reliable and repeatable way.

In addition, in the context of highly stressed composite materials, the degree of damage caused to a structure by an object impacting a surface of the structure can be easily hidden by the phenomenon of barely visible impact damage. According to this phenomenon structural damage can actually increase with distance from a surface to which an impact has occurred. The ability to ascertain the extent of such damage by the inspection of the topology of the impacted surface would be extremely valuable because a technique is available using a comparison of surface damage area and ultrasonic C scan measurements to determine this.

SUMMARY OF THE INVENTION

It is an object of the invention to provide a method of inspecting the topology of a surface of a structural member to ascertain the degree of cold working of metal immediately surrounding holes penetrating that surface and also to ascertain the extent of damage to impacted composite structures.

According to the invention there is provided a method of inspecting the topology of a surface of a structural member to determine the degree to which a known type of stress has been applied to the member, the method including the steps of providing a range of calibration samples of structurally equivalent members, the samples each having been subject to the known type of stress to a differing respective degree; supporting a Moiré grid in a position spaced from and co-extending with the surface to be inspected and at a small included angle to the surface; directing a source of light through the grid to strike the surface at an oblique angle thereto; viewing the surface through the grid in a direction substantially normal to the surface to view interference fringes and regions of distortion to the fringes, and measuring the extent of a said region of distortion and comparing the said measurement with equivalent measurements taken for respective calibration samples to determine the degree of stress applied to the member.

By the term, "structurally equivalent" is meant a sample having the same type of structure, eg. reinforced in the same way, the same structurally relevant dimensions, eg. thickness of the sample, and being of the same material. The interference fringes comprise shadows of the grid projected onto the surface combined with lines of the grid as directly viewed by the observer, and the regions of distortion of the fringes correspond to disturbance to the topology of the surface caused by a said application of stress to the member acting via the Poissons effect.

The step of making a said comparison between the said measurement and equivalent distances measured for calibration samples of a member of the same type, relevant dimensions (for example thickness) and material, may include determining which sample exhibits substantially the same measured distance as the said member, and noting the degree of stress applied to that sample, which degree of stress will substantially correspond to the stress, eg. degree of cold working of a hole, applied to the said member.

The method may include the step of adjusting the small included angle, for example by using a micrometer adjuster, to provide substantially the same fringe density as for the equivalent measurements taken on the calibration samples. In this way consistency of measurement is ensured.

The line spacings of the Moiré grid are preferably substantially in the range 1 to 200 lines per mm. At a line spacing of 1 per mm the apparatus would be capable of detecting a major dent, for example, in a surface of a member being inspected. Apparatus having line spacing within the range of substantially 5 to 20 lines per mm is preferred and a line spacing of substantially 10 lines per mm is most preferred, giving good resolution and range of application.

The method preferably includes the step of providing a said source of light of a generally parallel nature, eg. from a collimated source, to provide a linear interference pattern so as to facilitate accurate measurements when the observer's eye does not quite view the surface normal thereto.

The step of providing the source of light may conveniently comprise providing a substantially point source of light, eg. a light emitting diode. Provided the observer views the surface substantially normal thereto little loss of accuracy in measurement will result when such a light source is used.

The step of viewing the surface substantially normal thereto may be ensured by providing an optical aid so to indicate to the observer. The optical aid may comprise a mirror facing the observer fast with the body, the mirror having a line indicator spaced therefrom in the direction of the observer whereby, when the observer views the surface substantially normal thereto, no reflection of the line indicator will be observable in the mirror.

The step of measuring the extent of a said region of distortion may comprise taking the greatest possible measurement across the region substantially in a direction of undistorted fringes from commencement of distortion on one side thereof to ending of distortion on the other side thereof.

Where the distortion to the surface comprises an annular region surrounding a hole in the surface, the step of measuring the extent of the region of distortion may comprise taking the measurement substantially in a direction of undistorted fringes from a periphery of a said hole to a point of fringe distortion farthest from the said periphery.

The said oblique angle is desirably either 45 degrees or 63.2 degrees to enable a convenient relationship between grating pitch and surface displacement to be formed. The angles of 45 degrees and 63.2 degrees provide particularly convenient relationships between fringe order, grating pitch and displacement resolution since the vertical displacement per fringe is given by the reciprocal of the grating pitch divided by the tangent of the included angle. Thus tan 45=1, giving a resolution of 1 per pitch and tan 63.2 is approximately equal to 2, giving twice the resolution.

The method may include the step of providing a sighting device, for example a graticule, for the observer, which sighting device may be centred upon a region of distortion, eg. the centre of a hole believed to be cold worked, to facilitate accurate taking of the said measurements.

The observer may view the surface via the medium of a camera so that images of the measurements taken may be recorded. And more preferably the camera comprises a high resolution, preferably digital, still camera to enable the best possible accuracy of measurement to be achieved, when recording. When a digital camera is used, results of measurements taken may conveniently be transferred to a computer, for example for image processing or for long term use. Such a computer may be programmed to search for particular shapes of curve representing commencement or ending of regions of distortion of the fringes. In this way consistency of measurement between calibration samples and the member under test may be better achieved.

BRIEF DESCRIPTION OF THE DRAWINGS

The invention will now be described by way of example with reference to the accompanying drawings of which:

FIG. 5a is a graph of measurement of hole periphery to farthest extent of fringe distortion plotted against percentage applied expansion of the hole using the method and apparatus of the invention, for the entry face, FIG. 5b is a graph of measurement of hole periphery to farthest extent of fringe distortion plotted against percentage applied expansion of the hole, for the exit face.

DESCRIPTION OF THE PREFERRED EMBODIMENT

Figure 1:
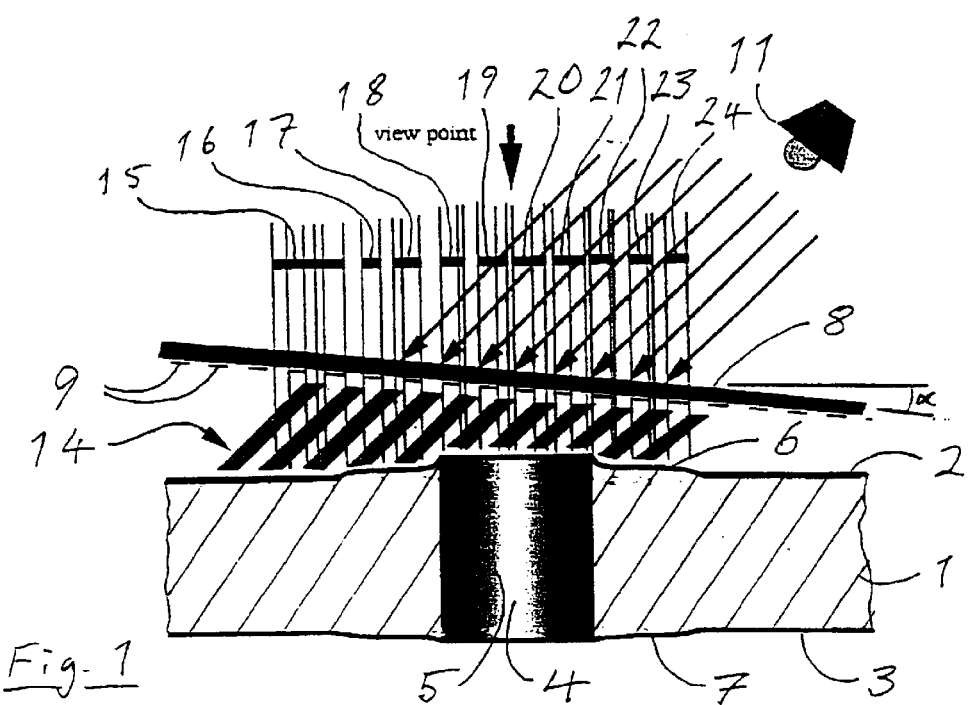
FIG. 1 is a schematic sectional view of a structural member penetrated by a cold expanded hole having the method of the invention applied to it.
Figure 2:
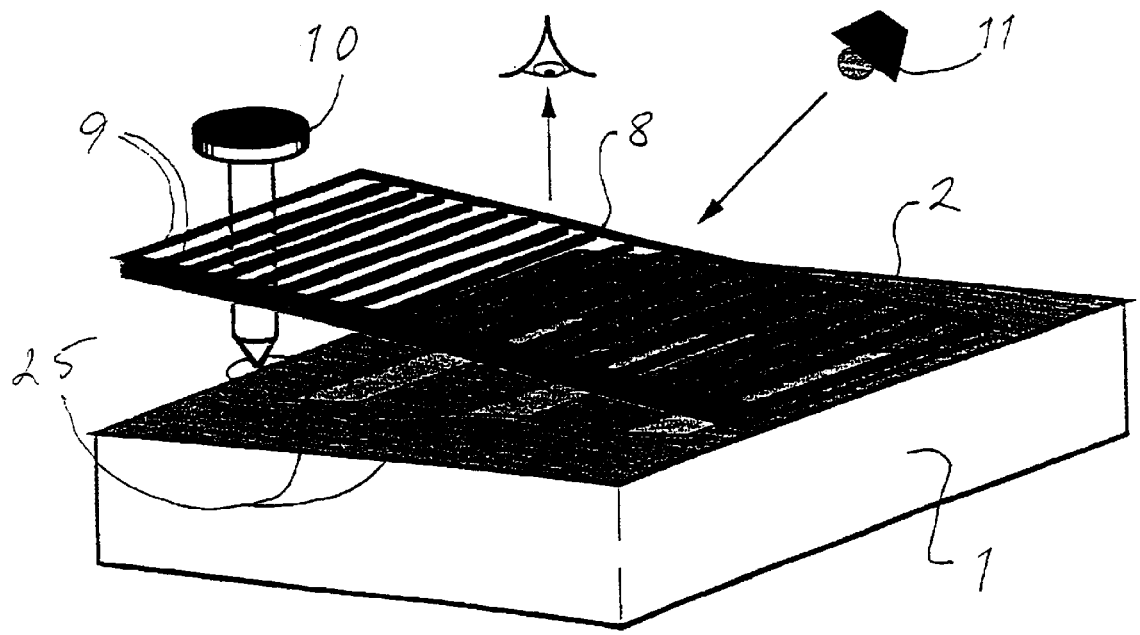
FIG. 2 is a schematic perspective view of a structural member with carrier fringes being viewed through a Moiré grid set at an angle to a surface of the member.
Figure 3:
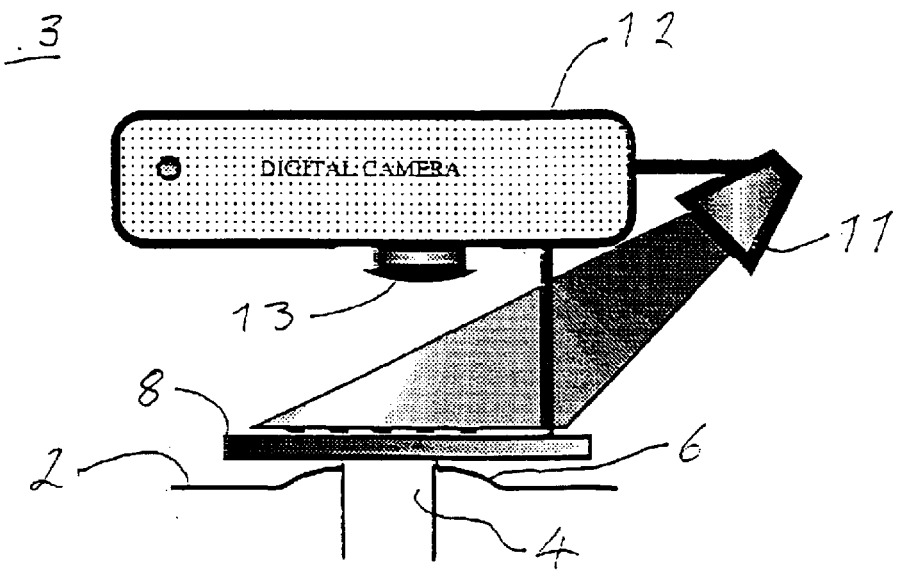
FIG. 3 is a side schematic view of apparatus according to the invention including a digital camera.

Referring to FIGS. 1, 2 and 3, apparatus according to the invention is shown for use with the method of the invention. A structural member 1 having an upper surface 2 and a lower surface 3 is penetrated by an aperture 4 defined by a circular wall 5 (see FIGS. 1 and 3). The aperture 4 is surrounded by a Poissons volcano 6 on the upper surface 2 and 7 on the lower surface 3. Supported above the member 1 and at a slight included angle alpha thereto (FIGS. 1 and 2) is a Moiré grid 8 having a grid spacing of 10 lines per millimetre. Gridlines 9 are shown greatly exaggerated in both size and spacing for reasons of clarity in the drawings. In FIG. 2 a micrometer angle adjuster 10 for the included angle alpha between the Moiré grid 8 and the upper surface 2 of the member is shown. The direction of viewing by an observer is shown by the arrows indicated. In each figure a collimated light source 11 is shown schematically.

In FIG. 3 a digital still camera 12 is shown having a lens 13 directed at the upper surface 2 of the member through the Moiré grid 8.

In FIG. 1 shadows 14 cast by lines 9 of the grid are shown which combine with dark lines 9 of the grid when viewed from above by the observer to produce combined interference and carrier fringes 15 to 24. In FIG. 2 carrier fringes 25 are shown appearing on the surface, as they would do to the viewers eye.

Taking FIGS. 4a, 4b, 4c, 4d and 5a, 5b together, it can be seen how, for a given type of metal plate having perhaps 3 or 4 diameters of aperture therethrough, a relatively restricted calibration programme can be used to ascertain the amount of cold working (if any) applied to a structural member defining an aperture therethrough of known material and thickness and having a known hole diameter. In FIGS. 4a to 4d the structural member is a metal plate and the four photographs of FIG. 4 show interference carrier fringes 25 having distortions thereto measured to ascertain the amount of cold working in each case. A distance is measured in each case from a point 26 on the periphery of the hole 4 to a position 27 where carrier fringe distortion first occurs.

It will be noted that the distance increases in each figure as the degree of expansion is increased. The outer edge of the Poissons volcano, indicated by position 27 in each photograph of FIG. 4 has been found to be very consistent, and when measurements are compared to comparative calibration samples surprising accuracy of measurement of the degree of cold expansion can be obtained.

Turning now to the graphs of FIGS. 5a and 5b constructed for calibration samples, it can be seen how measurements from point 26 to position 27 for the samples being tested can be read off the graphs to give an indication of cold expansion applied to the hole in each case.

Figure 8:
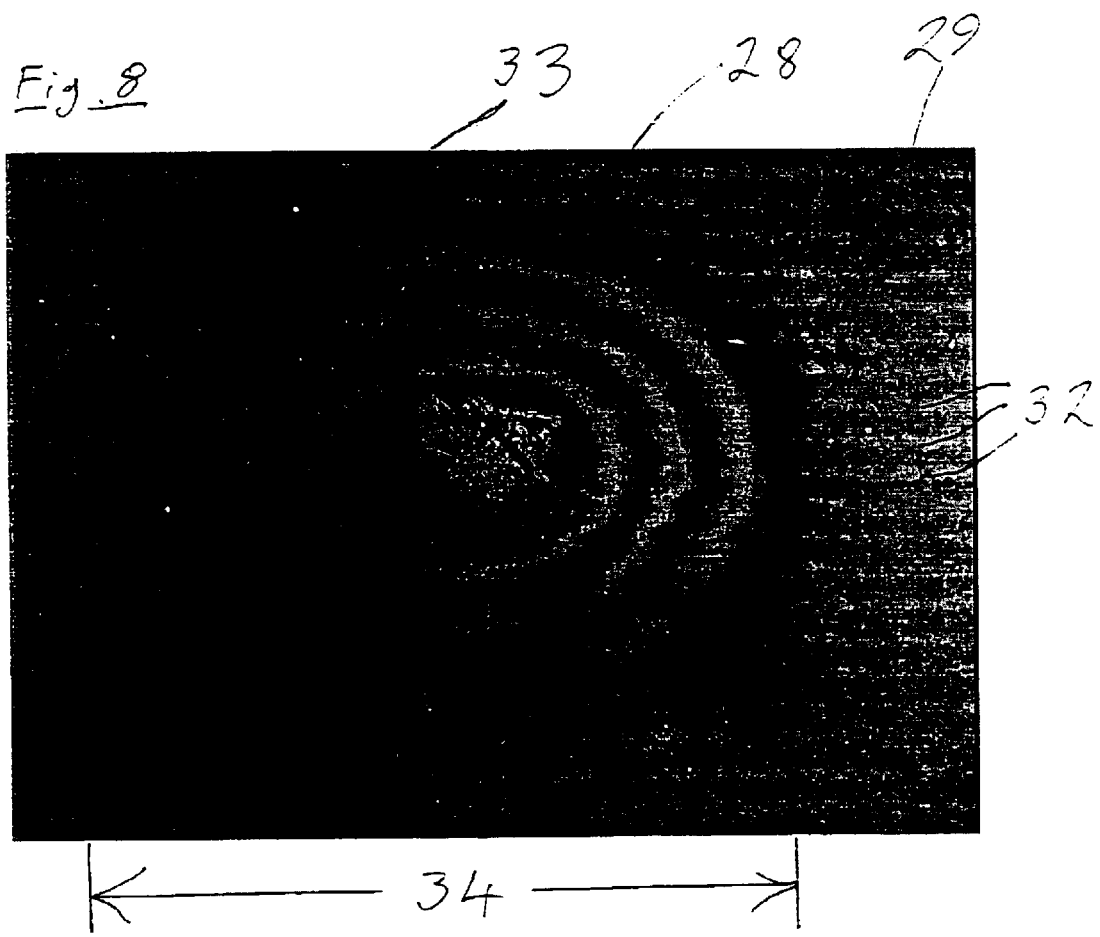
FIG. 8 is an image photographed, using a digital still camera, showing impact damage to a composite panel, using apparatus of the invention.
Figure 4:
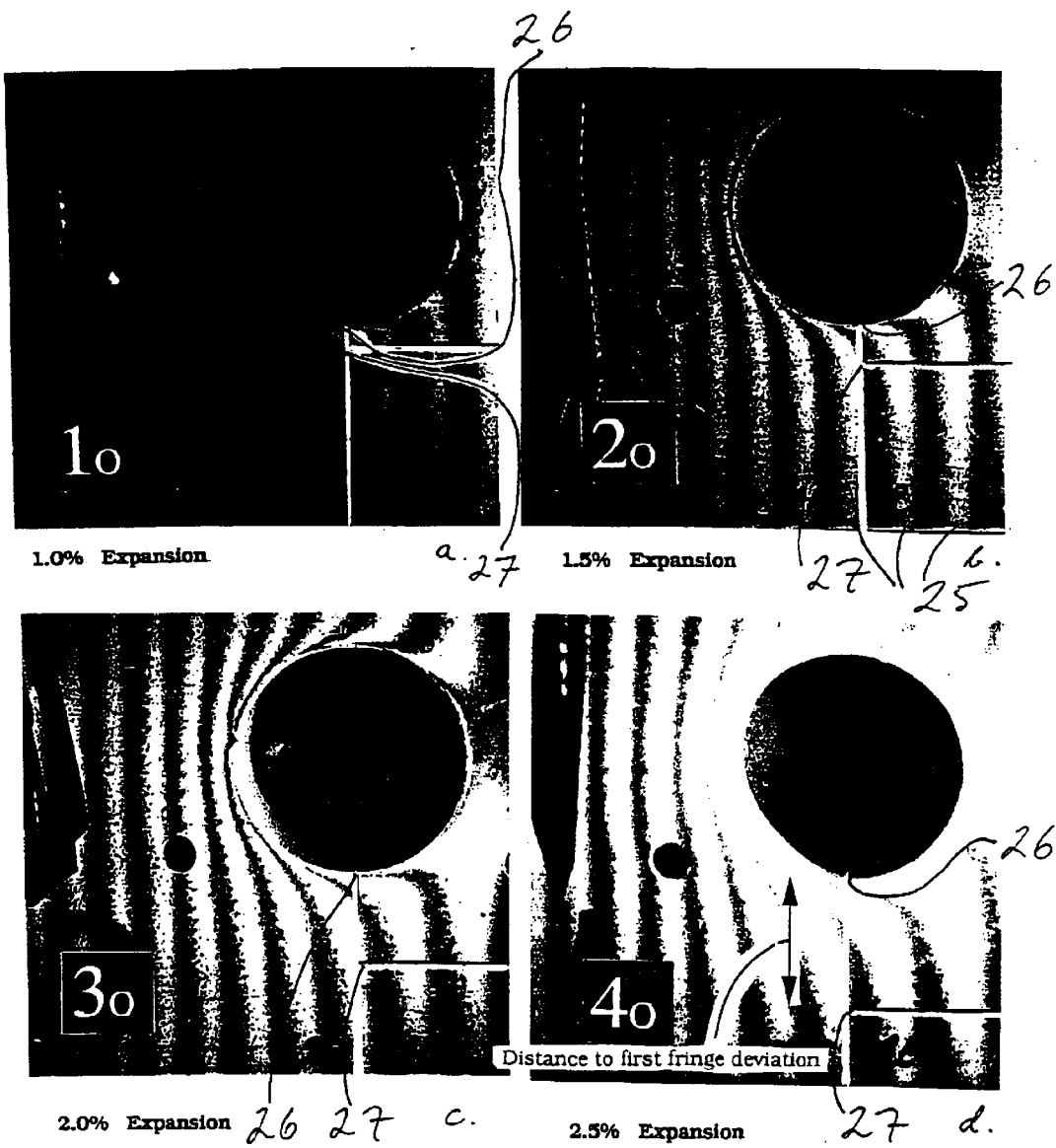
FIG. 4a is a photograph of interference fringes distorted in the region of a 1.0% cold expanded hole through a plate, taken on the exit face, showing measurement of the extent of distortion, according to the invention.
FIG. 4b is a photograph of interference fringes distorted in the region of a 1.5% cold expanded hole through the same plate, taken on the exit face, showing measurement of the extent of distortion.
FIG. 4c is a photograph of interference fringes distorted in the region of a 2.0% cold expanded hole through the same plate, taken on the exit face, showing measurement of the extent of distortion.
FIG. 4d is a photograph of interference fringes distorted in the region of a 2.5% cold expanded hole through the same plate, taken on the exit face, showing measurement of the extent of distortion.
Figure 6:
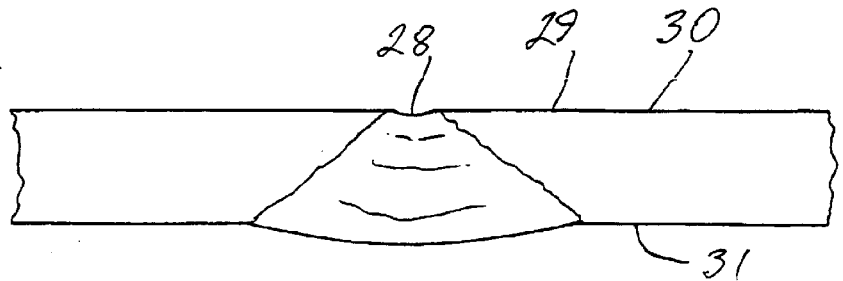
FIG. 6 is a sectional view of a structural member of fibre reinforced plastics composite material displaying the phenomenon known as barely visible impact damage ("BVID")

FIGS. 6 and 8 may be considered together. FIG. 6 shows in a sectional view how impact damage 28 can spread from an impacted surface 29 through the thickness of a fibre reinforced plastics composite member 30 to virtually destroy the integrity of the member in the region of the damage 28. It will be noted that the damage is barely visible on the impacted surface 29 but increases dramatically in size towards a rear surface 31.

FIG. 8 is a plan view of an impacted surface 29 of an actual structural member shown photographically. Straight interference fringes 32 are shown to be distorted for a considerable distance extending outwardly from an impact damage site 33 of the impacted surface 29. The region of distorted interference fringes 34, although visible through the Moiré grating as shown in FIG. 8 would be invisible to the naked eye upon inspecting the impacted surface 29. Each fringe represents 0.005 in surface displacement.

The method of the invention therefore provides reliable means to estimate the damage to a composite structure following a barely visible impact to a surface of that structure. Calibration curves may be produced relating volumetric damage induced through the material thickness using the method of the invention. The surface damage area would be ascertained by measuring the area of the distortion of the fringes 34 surrounding the damage site 33.

Figure 7:
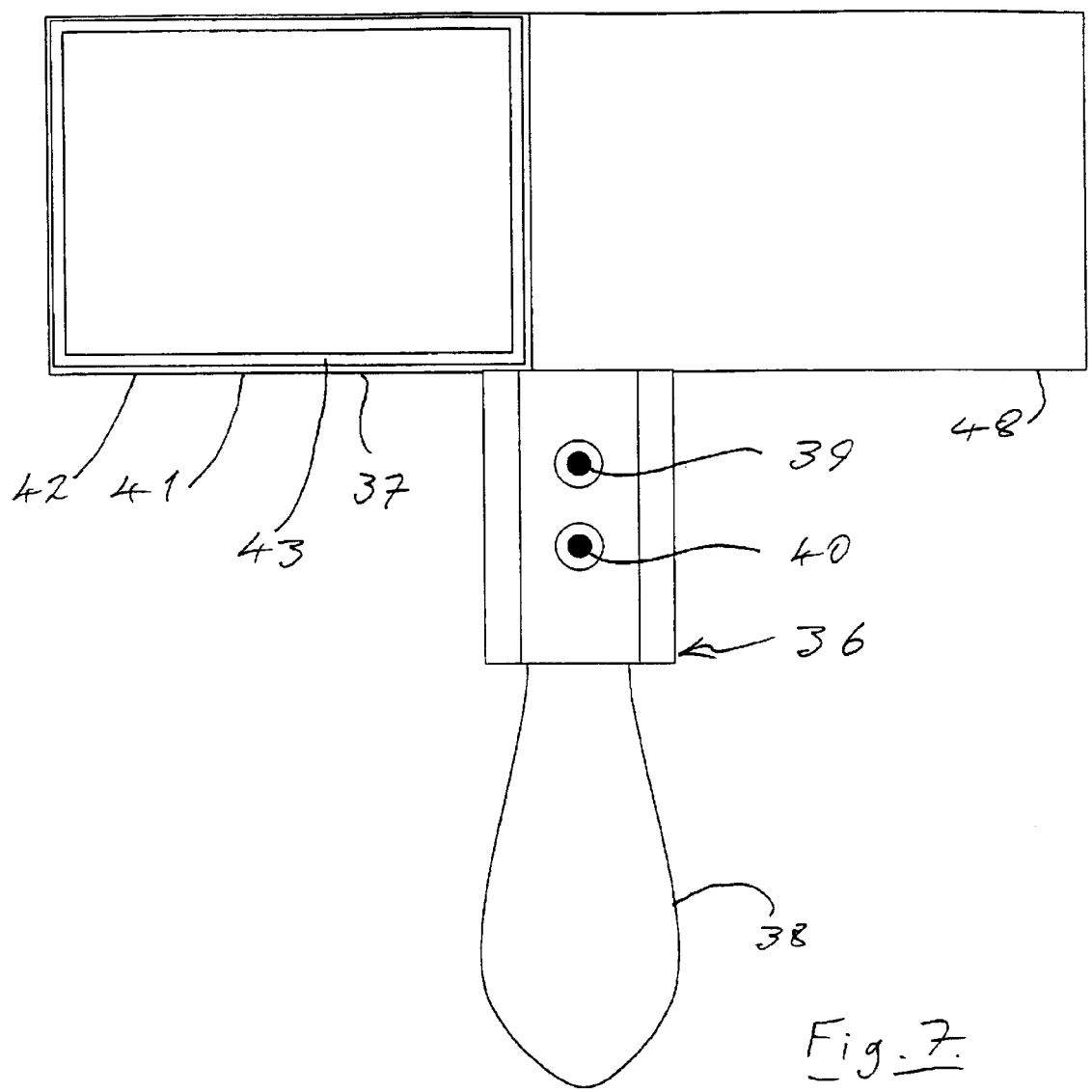
FIG. 7 is a bottom plan view of hand held apparatus of the invention.
Figure 9:
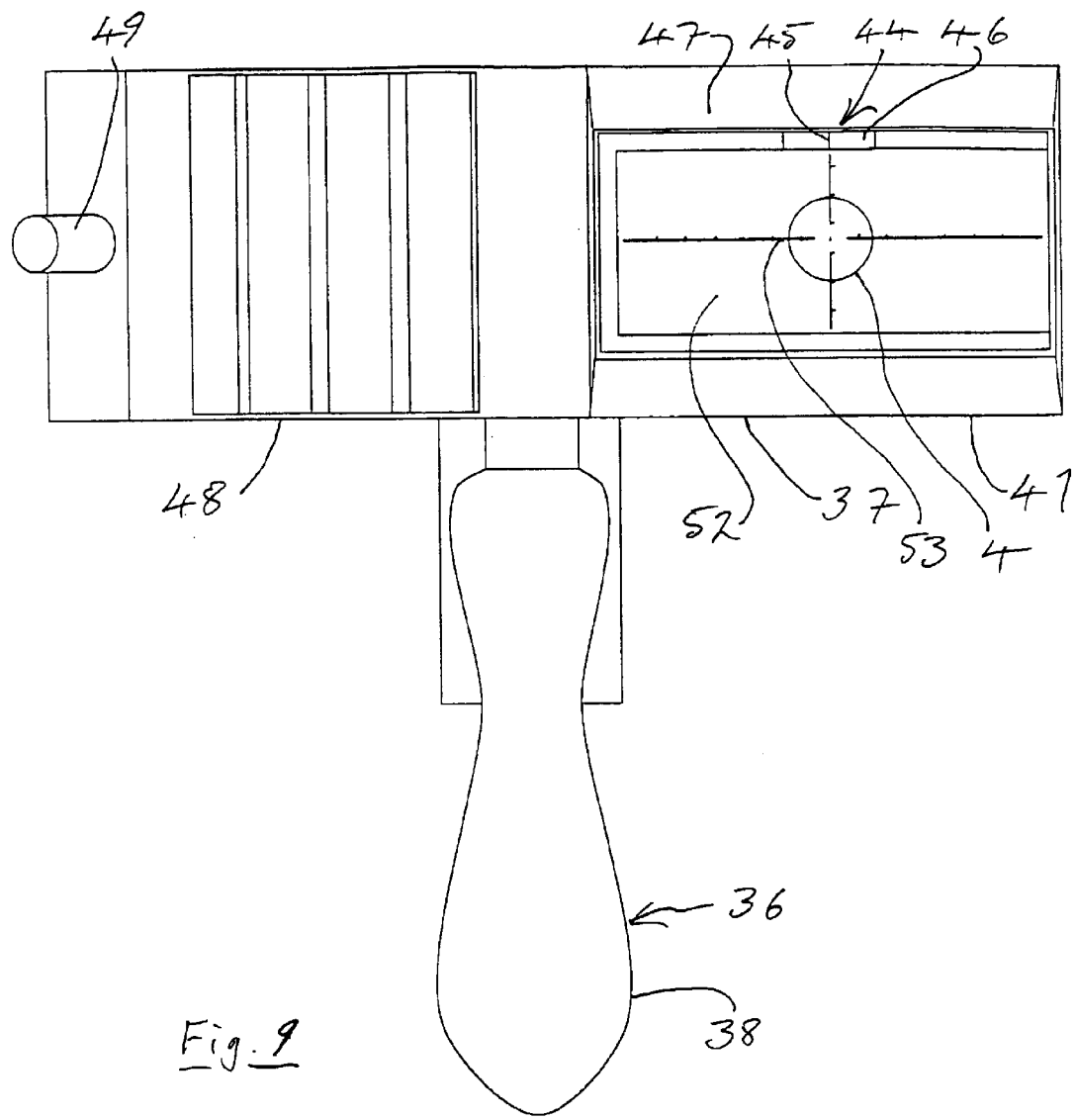
FIG. 9 is a top plan view of the apparatus of FIG. 7.
Figure 10:
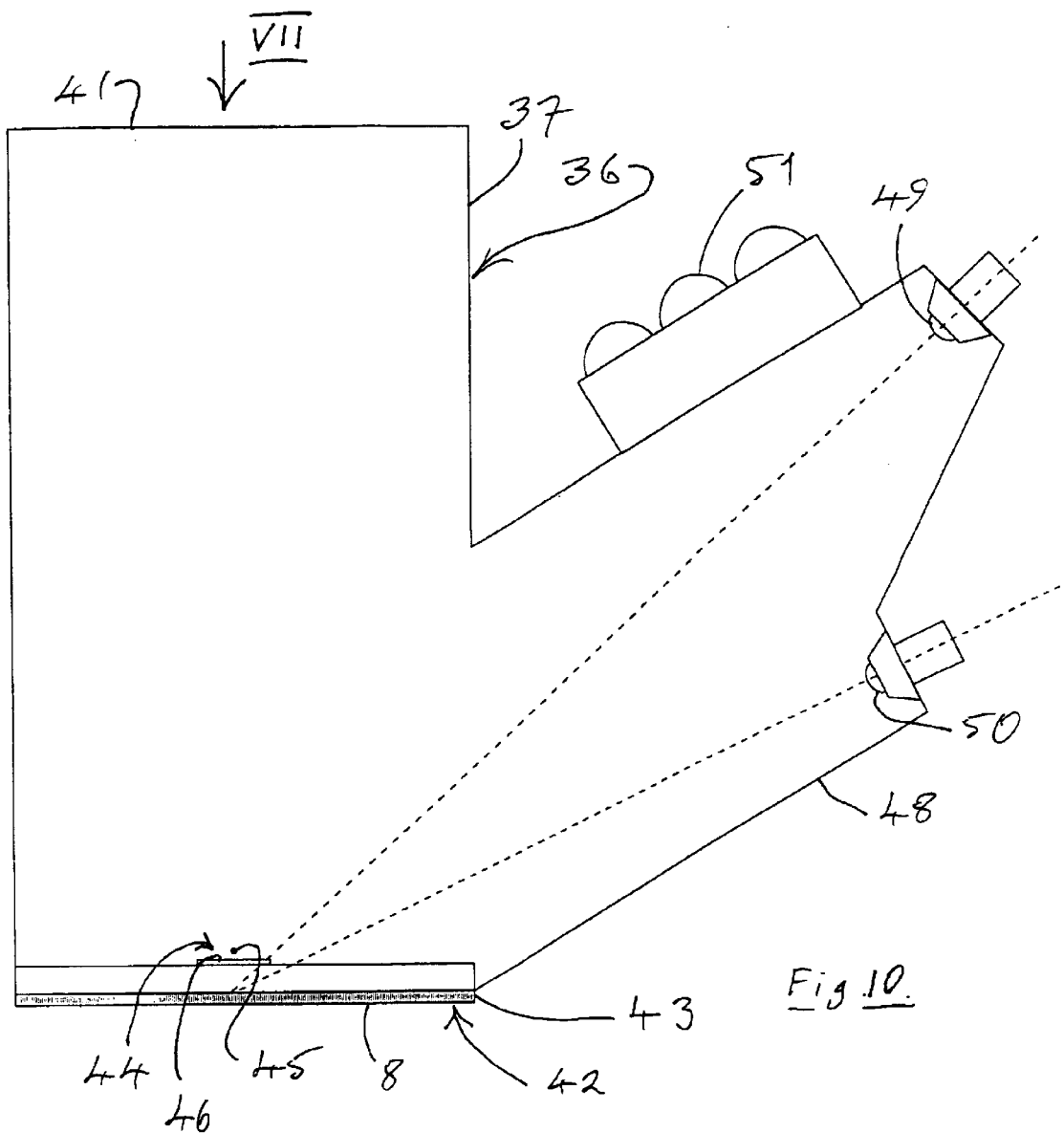
FIG. 10 is a schematic side sectional view of apparatus similar to that of FIG. 7.

FIGS. 7, 9 and 10 show hand held apparatus 36 according to the invention. The apparatus comprises a hollow body 37 of aluminium having a handle 38 carrying two buttons 39, 40. The hollow body has a first rectangular hollow tube 41 through which the observer views a surface being inspected via a Moiré grid 8 supported at a lower end 42 thereof. The Moiré grid is desirably pivotally mounted to the body 37 and adjustable via a micrometer screw, but this feature is not shown in FIGS. 7, 9 and 10, but is shown in FIG. 2. If such a feature appeared on the embodiment of FIG. 7 a lower rectangular frame 43 would be placed flat on the surface being inspected and the angle alpha which the grid would make with that surface would be adjustable with precision via the micrometer adjuster 10 shown in FIG. 2. This angle alpha could then be made accurately to reflect the same angle alpha used for calibration purposes.

Supported just above the Moiré grid 8 is a sighting device 44 comprising a needle 45 supported in spaced relationship to a mirror 46. When the surface of the member being inspected is viewed directly perpendicularly by the eye of the observer no reflection of the needle 45 will be seen by the observer in the mirror 46. In this way consistency of measurement can be achieved to enable accurate comparison with the calibration sample results.

Referring to FIG. 9 an upper portion 47 of the rectangular tube 41 is tapered to cut out as much extraneous light from the interior of the apparatus as possible. This feature is extremely useful in brightly lit shop floor environments where it would otherwise be difficult accurately to detect the interference fringes viewed through the Moiré grid.

The apparatus also includes a second rectangular tube 48 set at an angle to the first tube. The second tube carries two white 3.6 volt LED light sources 49, 50 acting substantially as point light sources. Buttons 39 and 40 are used individually to switch on the LEDs 49, 50, respectively. It will be observed that LED 49 is designed to shine at an angle of substantially 45° (alpha) to the surface being viewed. LED 50 makes an angle of substantially 63.2° with the said surface. The tube 48 also carries a battery pack 51 of three 1.2 volt nickel cadmium cells. The apparatus of the invention is thus totally self-sufficient which makes it particularly suitable for use on the shop floor when, for example, structural members contained in aircraft wings are being viewed. With the apparatus of the invention holes in structural wing members may be tested for cold expansion and compared with calibration samples of the same material and thickness having known amounts of cold working carried out to them. Thus for example if a crack has been detected in a surface of the wing structure it can be determined with accuracy the extent to which any hole from which the crack emanates has been cold worked, and in particular whether it has been cold worked to the specified degree. Through a viewing aperture 52 formed in the top of the tapered portion 47 of the tube 41 can be seen a graticule 53 and an aperture 4 in a surface being viewed. The graticule is centred on the aperture. Using the graticule, the distances between points 26 and positions 27 as aforesaid can accurately be read off.

It will thus be seen that the apparatus and method of the invention provide convenient and reliable means accurately to obtain measurements of the degree of cold working of holes in metallic structures and impact damage to composite structures.

What is claimed is:

1. A method of inspecting the topology of a surface of a structural member to determine the degree to which a known type of stress has been applied to the member, the method including the steps of:

providing a range of calibration samples of structurally equivalent members, the samples each having been subject to the known type of stress to a differing respective degree;

supporting a Moiré grid in a position spaced from and co-extending with the surface to be inspected and at a small included angle to the surface;

directing a source of light through the grid to strike the surface at an oblique angle thereto;

viewing the surface through the grid in a direction substantially normal to the surface to view interference fringes and regions of distortion to the fringes, and measuring the extent of a said region of distortion and comparing the said measurement with equivalent measurements taken for respective calibration samples to determine the degree of stress applied to the member.

2. A method as in claim 1 in which the step of making the comparison between the said measurement and equivalent distances measured for calibration samples of a member of the same type, relevant dimensions and material, may include determining which sample exhibits substantially the same measured distance as the said member, and noting the degree of stress applied to that sample, which degree of stress will substantially correspond to the stress applied to the said member.

3. A method as in claim 1 including the step of adjusting the small included angle to provide substantially the same fringe density as for the equivalent measurements taken on the calibration samples.

4. A method as in claim 1 including the step of providing a generally parallel said source of light.

5. A method as in claim 1 including the step of providing a substantially point source of said light.

6. A method as in claim 1 in which the step of measuring the extent of a said region of distortion comprises taking the greatest possible measurement across the said region substantially in line with the undistorted fringes, from commencement of distortion on one side of the region to ending of distortion on the other side thereof.

7. A method as in claim 1 in which, where the distortion to the surface comprises an annular region surrounding a hole in the surface, the step of measuring the extent of the region of distortion comprises taking the measurement substantially in line with the undistorted fringes from a periphery of a said hole to a point of fringe distortion farthest from the said periphery.

8. A method as in claim 1 including setting the said oblique angle substantially at one of 45 degrees and 63.2 degrees.

9. A method as in claim 1 including the step of taking a photographic image of the surface as viewed by the observer.

10. A method as in claim 9 including creating a digitized said photographic image, transferring the digitized image to a computer, image processing same and programming the computer to search for particular shapes of curve representing at least one of commencement and ending of regions of distortion of the fringes.

11. Apparatus for carrying out the method of claim 1 including a body supporting:

a Moiré grid for placement in a position spaced from and co-extending with the surface to be inspected and at a small included angle to the surface;

a source of light directed through the grid to strike the surface at an oblique angle thereto;

a viewing aperture for viewing the surface through the grid, and means for measuring the extent of a said region of distortion.

12. Apparatus as in claim 11 including a sighting device to enable the observer to determine whether the surface is being viewed substantially normal thereto.

13. Apparatus as in claim 12 in which the sighting device includes a mirror facing the observer, the mirror being fast with the body and having a line indicator spaced therefrom in the direction of the observer whereby when the observer views the surface substantially normal thereto no reflection of the line indicator will be observable in the mirror.

14. Apparatus as in claim 11 in which the source of light comprises a light emitting diode.

15. Apparatus as in claim 11 including a high resolution, digital, still camera to photograph the surface.

16. Apparatus as in claim 15 including a computer programmed to process a digital image from the camera and search for particular shapes of curve representing at least one of commencement and ending of regions of distortion of the fringes.

17. Apparatus as in claim 11 in which the line spacings of the Moiré grid are substantially in the range 1 to 200 lines per mm.

18. Apparatus as in claim 17 in which the said range is substantially 5 to 20 lines per mm.

19. Apparatus as in claim 18 in which the said line spacing is substantially 10 lines per mm.

* * * * *